United States Patent
Jung et al.

(10) Patent No.: US 8,737,945 B2
(45) Date of Patent: May 27, 2014

(54) METHOD FOR MEASURING INTER-FREQUENCY

(75) Inventors: Manyoung Jung, Anyang-si (KR); Suhwan Lim, Anyang-si (KR); Yoonoh Yang, Anyang-si (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/811,525

(22) PCT Filed: Dec. 22, 2010

(86) PCT No.: PCT/KR2010/009227
§ 371 (c)(1),
(2), (4) Date: Jan. 22, 2013

(87) PCT Pub. No.: WO2012/011643
PCT Pub. Date: Jan. 26, 2012

(65) Prior Publication Data
US 2013/0122840 A1    May 16, 2013

Related U.S. Application Data (60) Provisional application No. 61/366,942, filed on Jul. 23, 2010.

(30) Foreign Application Priority Data

Nov. 23, 2010   (KR) .................. 10-2010-0117135

(51) Int. Cl.
*H04B 17/00*    (2006.01)
*H04B 7/04*    (2006.01)

(52) U.S. Cl.
CPC .......... *H04B 17/0042* (2013.01); *H04B 7/0413* (2013.01)

USPC ...................... 455/226.2; 455/226.1; 455/272

(58) Field of Classification Search
CPC ............. H04B 7/0413; H04B 17/0042; H04B 17/0075
USPC .................. 455/226.1, 226.2, 226.3, 132, 272
See application file for complete search history.

(56) References Cited

U.S. PATENT DOCUMENTS

| | | | | |
|---|---|---|---|---|
| 6,212,368 | B1* | 4/2001 | Ramesh et al. | 455/277.2 |
| 6,507,570 | B1* | 1/2003 | Holma et al. | 370/333 |
| 6,546,252 | B1* | 4/2003 | Jetzek et al. | 455/437 |

(Continued)

OTHER PUBLICATIONS

Ghosh et al., "LTE-Advanced: Next-Generation Wireless Broadband Technology", IEEE Wireless Communications, Jun. 2010, pp. 10-22.

(Continued)

*Primary Examiner* — Duc M Nguyen
(74) *Attorney, Agent, or Firm* — Birch, Stewart, Kolasch & Birch, LLP (57) ABSTRACT

According to an embodiment of the present invention, a method is provided for measuring inter-frequency in a receiver including a plurality of reception antennas. The method may comprise the steps of: performing a service using a first frequency through a first antenna and/or a second antenna; measuring a second frequency using the first antenna while the service continues to be performed using the first frequency through the second antenna; and estimating the measurement result without the second frequency being practically measured through the second antenna by using the measurement result of the second frequency through the first antenna.

13 Claims, 9 Drawing Sheets

(56) References Cited

U.S. PATENT DOCUMENTS

| | | |
|---|---|---|
| 7,411,931 B2 * | 8/2008 | Holma et al. ............... 370/335 |
| 2004/0171384 A1 | 9/2004 | Holma et al. |
| 2006/0286945 A1 * | 12/2006 | Reznik et al. ............... 455/101 |
| 2010/0279638 A1 * | 11/2010 | Lindoff ..................... 455/226.1 |
| 2011/0235761 A1 * | 9/2011 | Oren ......................... 375/350 |

OTHER PUBLICATIONS

Kiiski, "LTE-Advanced: The Mainstream in Mobile Broadband Evolution", 2010 European Wireless Conference, Apr. 2010, pp. 983-988.

* cited by examiner

METHOD FOR MEASURING INTER-FREQUENCY

CROSS REFERENCE TO RELATED APPLICATIONS

This non-provisional application is a National Stage entry under U.S.C. §371 of International Application No. PCT/KR2010/009227 filed on Dec. 22, 2010, which claims the benefit of U.S. Provisional Application No. 61/366,942 filed on Jul. 23, 2010 and to Korean Patent Application No. 10-2010-0117135 filed in the Republic of Korea on Nov. 23, 2010. The entire contents of all of the above applications are hereby incorporated by reference.

TECHNICAL FIELD

The present invention relates to a method of measuring inter-frequency.

BACKGROUND ART

A $3^{rd}$ Generation Partnership Project (3GPP) wireless communication system based on Wideband Code Division Multiple Access (WCDMA) radio access technology is widely deployed worldwide. High Speed Downlink Packet Access (HSDPA) that may be defined as the first evolution stage of WCDMA provides 3GPP with radio access technology which has high competiveness in the mid-term future.

There is an E-UMTS for providing high competiveness in the long-term future. The E-UMTS is a system evolved from the existing WCDMA UMTS and is being standardized in 3GPP. The E-UMTS is also called a Long Term Evolution (LTE) system. For detailed contents of the technical specifications of the UMTS and E-UMTS, reference can be made to Release 7 and Release 8 of "$3^{rd}$ Generation Partnership Project; Technical Specification Group Radio Access Network".

The E-UMTS basically includes User Equipment (UE), a base station, and an Access Gateway (AG) placed at the end of a network (E-UTRAN) and connected to an external network. In general, a base station can transmit multiple data streams at the same time for broadcast service, multicast service and/or unicast service. In an LTE system, Orthogonal Frequency Divisional Multiplexing (OFDM) and Multi-Input Multi-Out (MIMO) are used in order to transmit a variety of services in downlink.

OFDM represents a high-speed data downlink access system. An advantage of OFDM is high spectrum efficiency that enables all allocated spectra to be used by all base stations. In OFDM modulation, a transmission band is classified into a plurality of orthogonal subcarriers in the frequency domain and classified into a plurality of symbols in the time domain. In OFDM, a bandwidth per subcarrier is reduced and a modulation time per carrier is increased because a transmission band is split into a plurality of subcarriers. Since the plurality of subcarriers is transmitted in parallel, the digital data or symbol transfer rate of a specific subcarrier is lower than those of a single carrier.

A Multi-Input Multi-Out (MIMO) system is a communication system that uses a plurality of transmission and reception antennas.

A MIMO system can increase a channel capacity linearly without increasing an additional frequency bandwidth according to an increase in the number of transmission and reception antennas. MIMO technology includes a spatial diversity method capable of increasing transmission reliability using a symbol which has passed through a variety of channel paths and a spatial multiplexing method of increasing the transfer rate in such a manner that antennas transmit different data streams at the same time using a plurality of transmission antennas.

MIMO technology may be chiefly divided into open-loop MIMO technology and closed-loop MIMO technology depending on which a transmission stage knows channel information or not. In the open-loop MIMO technology, a transmission stage does not know channel information. Examples of the open-loop MIMO technology include Per Antenna Rate Control (PARC), Per Common Basis Rate Control (PCBRC), BLAST, STTC, and random beamforming. In contrast, in the closed-loop MIMO technology, a transmission stage knows channel information. The performance of a closed-loop MIMO system depends on how exactly is the channel information known. Examples of the closed-loop MIMO technology include Per Stream Rate Control (PSRC) and TxAA.

Channel information means information (e.g., attenuation, phase shift or time delay) about a wireless channel between a plurality of transmission antennas and a plurality of reception antennas. In a MIMO system, there are a variety of stream paths according to a plurality of transmission and reception antenna combinations, and a channel state has a fading characteristic in which the channel state is irregularly changed in the time/frequency domains over time due to time delay. Accordingly, a transmission stage calculates channel information through channel estimation. Channel estimation is to estimate channel information necessary to restore a distorted transmission signal. For example, channel estimation refers to the estimation of the size of a carrier and a reference phase. That is, channel estimation is to estimate the frequency response of a radio section or a radio channel.

A channel estimation method includes a method of estimating a reference value based on the Reference Signals (RSs) of several base stations using a two-dimensional channel estimator. Here, an RS refers to a symbol which does not have data actually, but has high output in order to help in obtaining carrier phase synchronization and base station information. The transmission side and the reception side can perform channel estimation using the RS. In channel estimation using an RS, a channel is estimated through a symbol that is known to both transmission and reception sides, and data is restored using the estimated value. An RS is also called a pilot.

Figure 1:
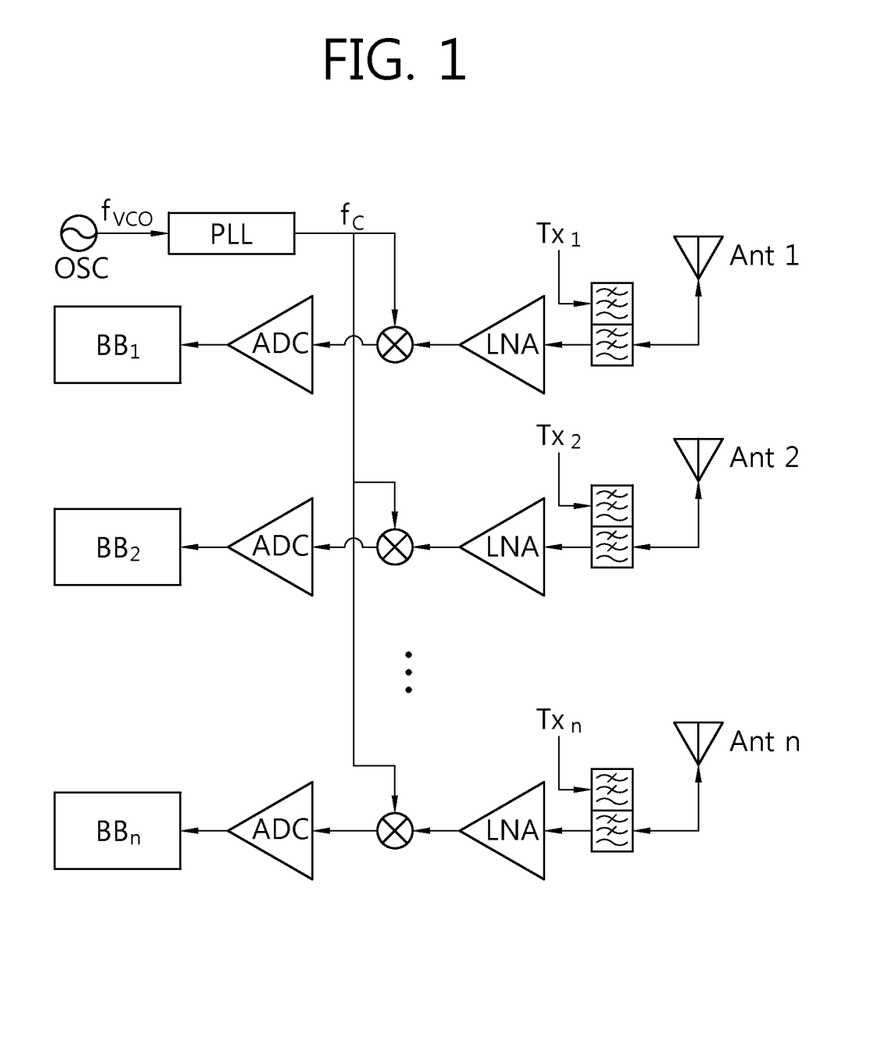
FIG. 1 shows the structure of a receiver which supports MIMO.

FIG. 1 shows the structure of a receiver which supports MIMO.

As can be seen with reference to FIG. 1, the receiver which supports MIMO includes a plurality of antennas, a plurality of Low Noise Amplifiers (LNAs), a plurality of mixers, a plurality of Analog Digital Converters (ADCs), an oscillator (OSC), and a Phase-Locked Loop (PLL).

Signals Tx1, Tx2, . . . , Txn received from the respective antennas are amplified by the respective LNAs. The phase of a signal from the OSC is locked by the PLL, and the signal is distributed to the mixers. The mixers compose the signals from the LNAs and output the composed signals to the respective ADCs. The ADCs convert the respective signals into digital signals and output the digital signals as baseband signals, that is, B1, B2, . . . , Bn.

Meanwhile, in mobile UE including the MIMO receiver as described above, channel measurement is performed in the reception units at the same time in order to use an optimal wireless channel, and representative values of values measured by the respective reception units are transmitted to a base station.

Meanwhile, in channel measurement, a variety of items, such as a Received Signal Strength Indicator (RSSI), may be measured in order to configure an optimal communication environment and utilize radio resources efficiently.

In the case of the MIMO UE, the reception units perform measurement independently using the measurement items, calculate representative values, and report them to a higher layer. An equation therefore is as follows.

$$m = f(m_1, m_2, \ldots, m_n)$$ Equation 1

In the above equation, $m_1$, $m_2$, and $m_n$ are instantaneous measurement values measured by the first, second, and $n^{th}$ reception units of a plurality of reception units, f( ) means a statistical function, such as a maximum value or the mean value according to each measurement item, m is a representative value of a corresponding measurement item calculated through f( ). A higher layer performs upper filtering on the representative value additionally in order to reduce an error probability and uses the resulting value to perform optimization for the use of radio resources, such as handover or resource allocation.

A measurement item used in this radio transmission technology is basically divided into intra-frequency measurement and inter-frequency measurement.

Intra-frequency measurement is measurement for a frequency that is now being used. Since a reception unit including a baseband and a Radio Frequency (RF) is already set to a frequency now being used, the intra-frequency measurement can be performed without any influence while service is used.

In contrast, the inter-frequency measurement is measurement for a frequency different from a frequency that is now being used. In this measurement, an interruption of service that is being used, including a call, is indispensable during a measurement section due to limited embodiments if there is no additional reception unit.

Accordingly, a form in which a measurement gap is used, as in compressed mode in UMTS WCDMA, is being discussed and consideration to the form is included in a standard, but there are problems, such as a service stop or deteriorated call quality.

Meanwhile, the problems of inter-frequency measurement are recently actively discussed in standard LTE-A in order to solve the problems.

In the case of the LTE-A, in order to realize high-speed radio transmission, a variety of schemes including uplink MIMO and a Carrier Aggregation (CA) have been added. The CA is classified into an intra-band contiguous CA, an intra-band non-contiguous CA, and an inter-band non-contiguous CA, and a UE architecture that may be embodied is limited depending on each CA function. Basically, a UE architecture which supports a CA requires transceiver units equal to the number of Component Carriers (CCs) of a CA that may be supported at the same time. However, in the case of the intra-band contiguous CA, the application of a single-RF structure using the transceiver unit of a wideband which can support all CA bands at the same time is being actively discussed by taking several advantages in embodying UE into consideration.

Furthermore, in the case of a CA, the remaining Secondary Cells (S-Cells) other than a Primary Cell (P-Cell) are being standardized in such a manner that they are configured to be frequently activated/deactivated depending on the amount of necessary channels and user data in order to reduce the power consumption of UE. Thus, there is a need for frequent measurement for deactivated S-Cells. The measurement for deactivated S-Cells may be considered as a kind of inter-frequency measurement. In this CA, in the case of an intra-band non-contiguous CA and an inter-band CA which basically uses hardware in parallel, measurement for deactivated S-Cells can be performed by activating a deactivated RF chain without an additional service stop.

In contrast, in the case of intra-band contiguous CA technology in which a single RF chain is expected to be chiefly used, inter-frequency measurement for deactivated S-Cells requires the retuning of each reception unit including the retuning of a baseband and an RF, and thus a service stop occurs during this section.

Figure 2:
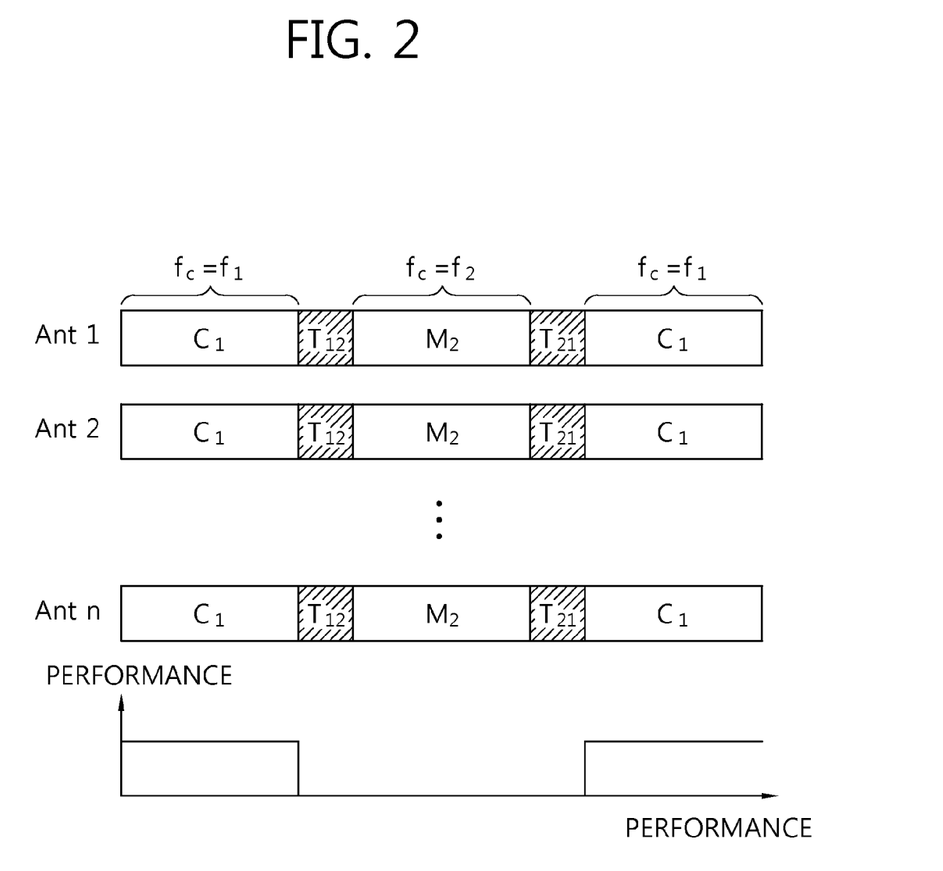
FIG. 2 shows a state when UE capable of supporting MIMO and receiving only one frequency at once performs measurement for each reception unit.

FIG. 2 shows a state when UE capable of supporting MIMO and receiving only one frequency at once performs measurement for each reception unit.

As can be seen with reference to FIG. 2, the UE may use service using a first frequency $f_1$ and the UE has to perform measurement for a second frequency $f_2$. A section $C_1$ is a section in which service is now being performed, and $T_{12}$ and $T_{21}$ mean respective sections in which the retuning of a reception unit is performed between the first and the second frequencies $f_1$ and $f_2$.

Furthermore, a section $M_2$ indicates that the UE is performing actual channel quality measurement for the second frequency $f_2$. The frequency of a carrier used in a frequency-down converter for each reception unit is indicated on the upper side of a section that corresponds to each reception unit.

The UE can support MIMO and receive only one frequency at once, and thus service through the first frequency $f_1$ is stopped in the sections $T_{12}$, $M_2$, and $T_{21}$. An ideal transfer rate of the UE is shown at the bottom of FIG. 2.

This type of measurement can be seen from common inter-frequency measurement, such as compressed mode of WCDMA.

Figure 3:
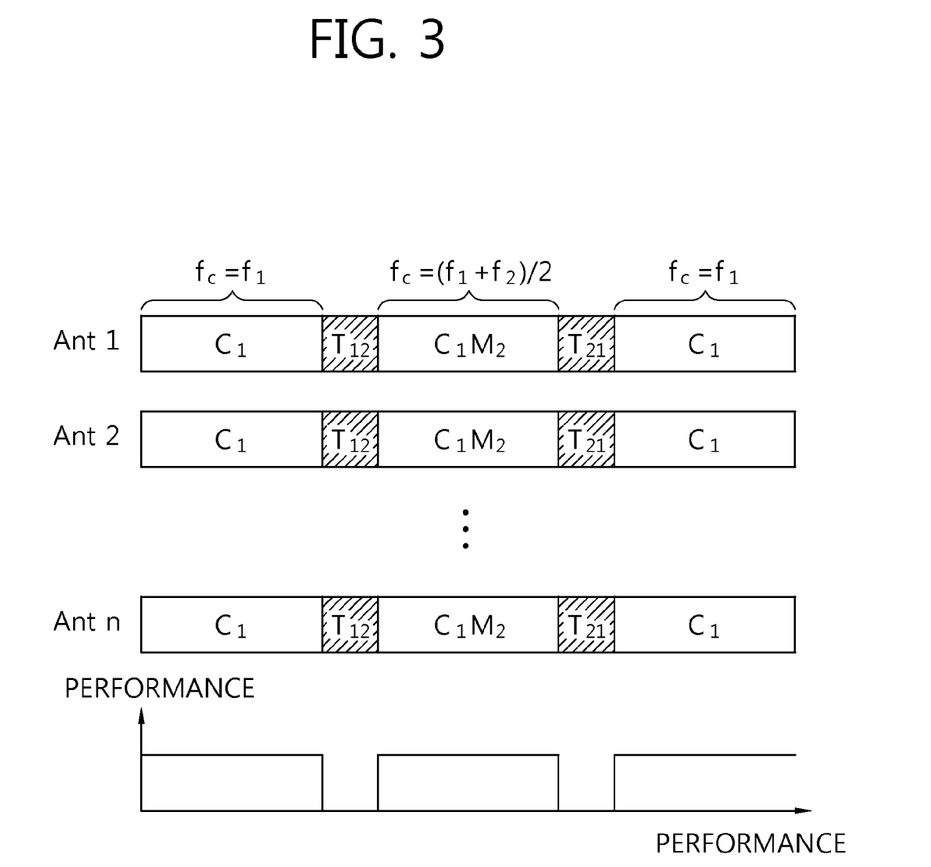
FIG. 3 shows a state when UE capable of supporting MIMO and receiving two or more frequencies at once at the same time performs measurement for each reception unit.

FIG. 3 shows a state when UE capable of supporting MIMO and receiving two or more frequencies at once at the same time performs measurement for each reception unit.

As can be seen with reference to FIG. 3, the UE can perform service using a first frequency $f_1$ and has to perform measurement for a second frequency $f_2$.

Here, a section $C_1$ is a section in which service is now being performed, and sections $T_{12}$ and $T_{21}$ indicate respective sections in which the retuning of a reception unit is performed between the first frequency $f_1$ and the second frequency $f_2$. $C_1M_2$ is a section in which service may be used using the first frequency $f_1$, but measurement for the second frequency $f_2$ is performed.

The frequency of a carrier used in a frequency-down converter for each reception unit is indicated on the upper side of a section that corresponds to each reception unit.

The UE can support MIMO and receive only one frequency, and thus an actual call stop is generated only in the sections $T_{12}$ and $T_{21}$ in which a reception unit including the retuning of a baseband and an RF is generated.

An ideal transfer rate of the UE is presented at the bottom of FIG. 3.

As can be seen with reference to FIG. 3, the UE capable of receiving one frequency at once has a smaller call interruption section than that of FIG. 2, but still includes a call interruption section.

DISCLOSURE

Technical Problem

As described above, there is a disadvantage in that a service interruption occurs if there is no additional hardware assistance when performing inter-frequency measurement. Furthermore, the service interruption results in problems, such as a reduction in the capacity of the entire system and deteriorated call quality, as the frequency of measurement increases.

Accordingly, an object of an embodiment of the present invention is to solve the above-described problems. In other words, an object of an embodiment of the present invention is to minimize the stop of service and also allow a reception terminal to perform inter-frequency measurement.

Furthermore, an object of an embodiment of the present invention is to provide an inter-frequency measurement method capable of increasing the transfer rate of the entire system and improving quality of service.

Technical Solution

In order to achieve the objects, in accordance with an embodiment of the present invention, there is provided a method of measuring inter-frequency in a receiver including a plurality of reception antennas.

The measurement method may include the step of performing service using a first frequency through one or more of a first antenna and a second antenna; performing measurement for a second frequency using the first antenna while continuing to perform the service using the first frequency through the second antenna; and estimating a result of measurement for the second frequency through the second antenna without actual measurement for the second frequency through the second antenna, using a result of the measurement for the second frequency through the first antenna.

Service may be performed by receiving and processing the first frequency through the first antenna, while the measurement for the second frequency is performed.

The step of performing the measurement for the second frequency may include the step of retuning a reception terminal of the first antenna to the second frequency. Service may be performed by receiving and processing the first frequency through the second antenna while the reception terminal of the first antenna is retuned to the second frequency.

A measurement value for the second frequency through the second antenna may be estimated using a result of the measurement for the second frequency through the first antenna and a statistical characteristic error value between the first antenna and the second antenna.

Assuming that a measurement value for the second frequency through the second antenna is $m_{2,k}$, the $m_{2,k}$ may be estimated by an equation $m_{2,k} = m_{2,n} + \Delta_{2,kn} \approx m_{2,n} + \Delta_{1,kn}$, the $m_{2,n}$ may be a measurement value for the second frequency through the first antenna, $\Delta_{2,kn}$ may be an error of a statistical characteristic between the measurement value through the first antenna and the measurement value through the second antenna for the second frequency, and $\Delta_{1,kn}$ may be an error of a statistical characteristic between a measurement value through the first antenna and a measurement value through the second antenna for the first frequency $f_1$.

$\Delta_{2,kn} \approx \Delta_{1,kn} \approx m_{1,k} - m_{1,n}$, the $m_{1,k}$ may be a result of the measurement value for the first frequency in the first antenna, and the $m_{1,n}$ may be a result of the measurement value for the first frequency in the second antenna.

Meanwhile, in order to achieve the objects, in accordance with an embodiment of the present invention, there is provided a method of measuring inter-frequency in a receiver including a plurality of reception antennas. The measurement method may include the steps of performing service using a first frequency through one or more of a first antenna and a second antenna; simultaneously performing measurement for the first frequency and the second frequency, while continuing to perform service using the first frequency through the first antenna; performing measurement for the first frequency while continuing to perform service using the first frequency through the second antenna; and estimating a result of measurement for the second frequency through the second antenna without actual measurement for the second frequency through the second antenna, using a difference between result values of the measurement for the first frequency through the first antenna and the second antenna and a result value of the measurement for the second frequency in the second antenna.

The measurement method may further include the step of performing service using the first frequency through the second antenna, while performing the measurement for the first frequency and the second frequency through the first antenna.

The measurement method may further include the step of retuning a reception terminal of the first antenna to the second frequency in order to perform the measurement for the first frequency and the second frequency through the first antenna.

Service may be performed by receiving and processing the first frequency through the second antenna while the reception terminal of the first antenna is retuned to the second frequency.

Advantageous Effects

An embodiment of the present invention can prevent an interruption of service that is now being used although there is no additional reception unit for only measurement. Furthermore, an embodiment of the present invention can increase the transfer rate of the entire system and improve quality of service.

Furthermore, in an embodiment of the present invention, as compared with conventional technology, scheduling becomes facilitated in terms of a system and the influence of interference due to a measurement gap is reduced because a measurement gap for a service interruption needs not to be used.

Additionally, there is an advantage of a power reduction because the retuning of a reception unit is reduced to a minimum.

MODE FOR INVENTION

Technical terms used in this specification are used to describe only specific embodiments, and it is to be noted that the terms are not intended to limit the present invention. Furthermore, the technical terms used in this specification should be interpreted as having meanings that are commonly understood by a person having ordinary skill in the art to which the present invention belongs, unless specifically defined in this specification, and should not be interpreted as having excessively comprehensive meanings or excessively reduced meanings. Furthermore, if the technical terms used in this specification are erroneous technical terms that do not precisely represent the spirit of the present invention, they should be replaced with technical terms that may be correctly understood by a person having ordinary skill in the art and understood. Furthermore, common terms used in the present invention should be interpreted in accordance with the definitions of dictionaries or in accordance with the context and should not be interpreted as having excessively reduced meanings.

Furthermore, an expression of the singular number used in this specification includes an expression of the plural number unless clearly defined otherwise in the context. In this application, terms, such as "comprise" and "include", should not be interpreted as essentially including all several elements or several steps described in the specification and should be interpreted as not including some of the elements or steps or as including additional element or steps.

It is also to be noted that the suffixes of elements used in this specification, such as a "module" and a "unit," are assigned or mixed in use by taking only the easiness of writing this specification into consideration, but themselves are not given particular importance and roles.

Furthermore, terms including ordinal numbers, such as the first and the second used in this specification, may be used to describe a variety of elements, but the elements should not be limited to the terms. The terms are used to only distinguish one element from the other element. For example, a first element may be named a second element and likewise a second element may be named a first element without departing from the scope of the present invention.

Hereinafter, preferred embodiments in accordance with the present invention are described in detail with reference to the accompanying drawings. The same or similar elements are assigned the same reference numerals irrespective of reference numerals, and a redundant description thereof is omitted.

Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

Prior to a detailed description of embodiments of the present invention, a brief description is given in order to help understanding.

In accordance with the present invention, there are proposed a first embodiment and a second embodiment for performing measurement without an interruption of service. In accordance with the first embodiment, reception units perform measurement with a time difference in order to remove a service interruption. In accordance with the second embodiment, only one reception unit performs substantial measurement, and the results of measurement of the remaining reception units are estimated using a difference between the characteristics of the respective reception units as a result of the measurement. The first embodiment and the second embodiment are described in detail below.

Figure 4:
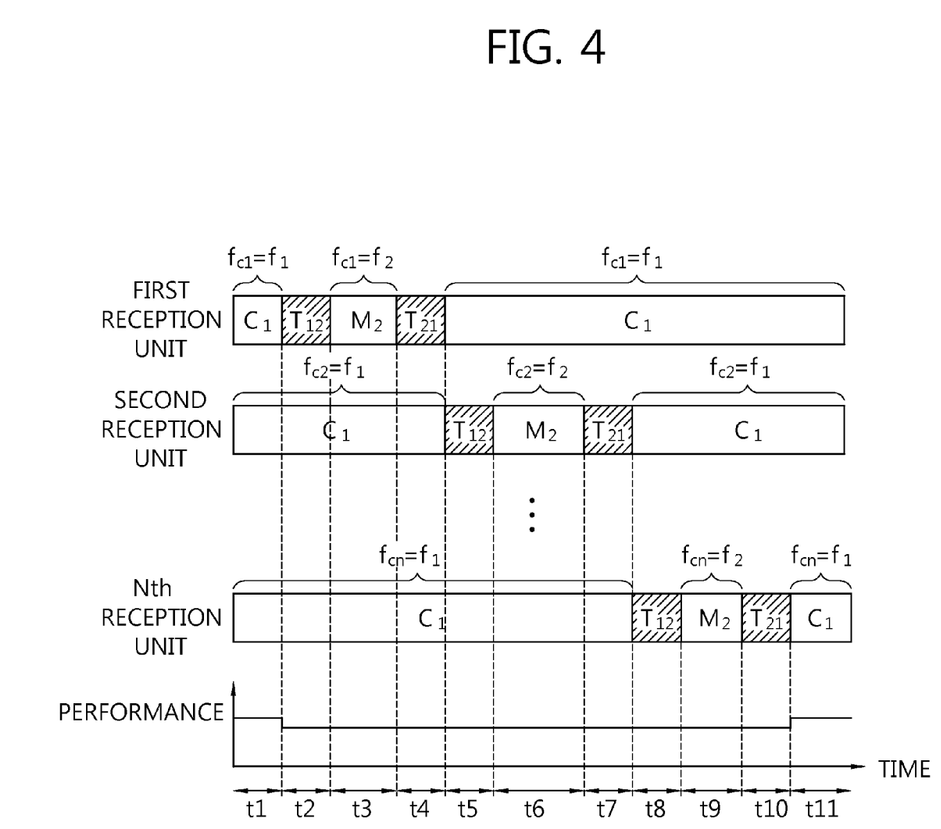
FIG. 4 is an exemplary diagram showing a method in which reception units perform inter-frequency measurement with a time difference in accordance with a first embodiment in UE which can support MIMO and receive only one frequency at once.

FIG. 4 is an exemplary diagram showing a method in which reception units perform inter-frequency measurement with a time difference in accordance with a first embodiment in UE which can support MIMO and receive only one frequency at once.

As can be seen with reference to FIG. 4, the UE can use service using a first frequency $f_1$ and the UE has to perform measurement for a second frequency $f_2$. A section $C_1$ is a section in which service is now being performed, and sections $T_{12}$ and $T_{21}$ mean respective sections in which the retuning of a reception unit is performed between the second frequency $f_1$ and the second frequency $f_2$.

Furthermore, a section $M_2$ indicates that the UE is performing actual channel quality measurement for the second frequency $f_2$. The frequency of a carrier used in a frequency-down converter for each reception unit is indicated on the upper side of a section that corresponds to each reception unit.

If the UE capable of receiving only one frequency at once performs measurement according to conventional technology, a service stop is generated in the sections $T_{12}$, $M_2$, and $T_{21}$. In the present invention, however, since the sections are disposed with a time difference so that only one reception unit enters a service stop section, the total measurement section is increased, but a service stop section does not occur. Furthermore, the total transfer rate may be slightly reduced in a measurement section, but only one reception unit is not stopped. Accordingly, a reduction of the transfer rate may be neglected. Meanwhile, there is an advantage in that an additional measurement gap is not necessary.

An ideal transfer rate of UE is presented at the bottom of FIG. 4.

Figure 5:
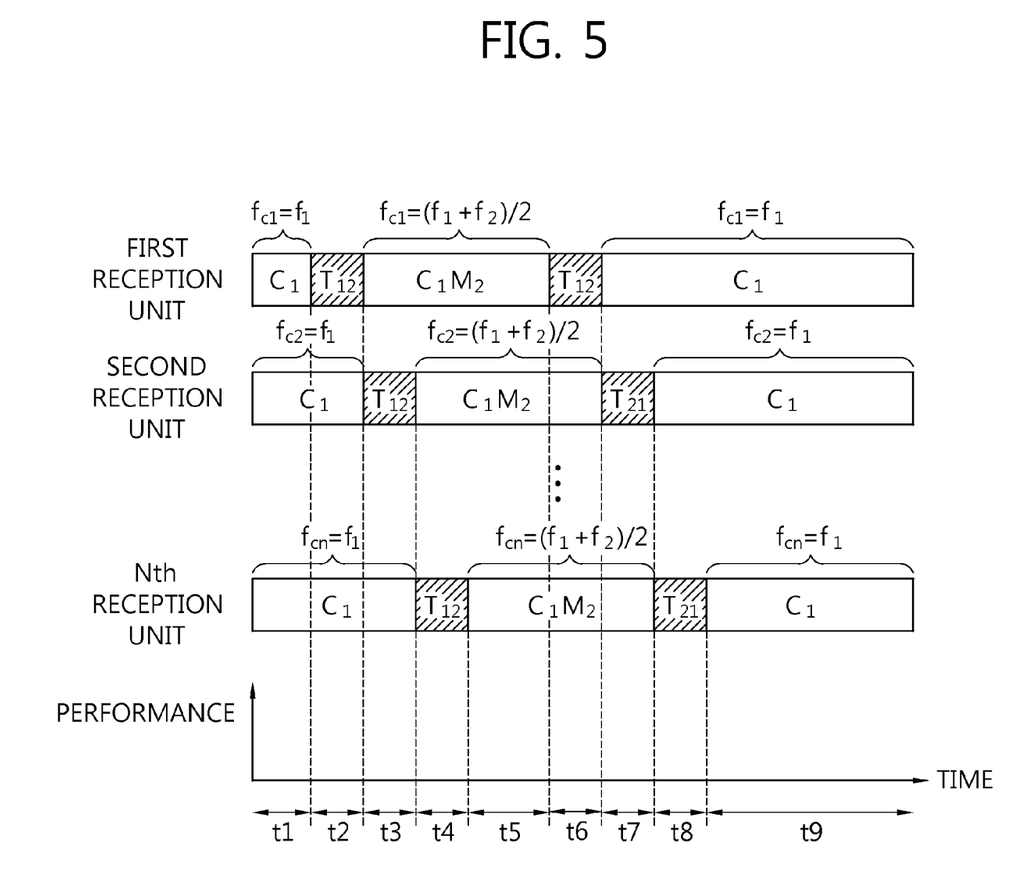
FIG. 5 is an exemplary diagram showing a method in which each reception unit performs inter-frequency measurement with a time difference in accordance with the first embodiment in UE which can support MIMO and receive two or more frequencies at once at the same time.

FIG. 5 is an exemplary diagram showing a method in which each reception unit performs inter-frequency measurement with a time difference in accordance with the first embodiment in UE which can support MIMO and receive two or more frequencies at once at the same time.

As can be seen with reference to FIG. 5, the UE can use service using a first frequency $f_1$, and the UE has to perform measurement for a second frequency $f_2$. A section $C_1$ is a section in which service is now being provided, and sections $T_{12}$ and $T_{21}$ mean respective sections in which the retuning of a reception unit is performed between the first frequency $f_1$ and the second frequency $f_2$. $C_1M_2$ is a section in which service is being used in the first frequency $f_1$ and measurement for the second frequency $f_2$ is performed.

The frequency of a carrier used in a frequency-down converter for each reception unit is indicated on the upper side of a section that corresponds to each reception unit.

In FIG. 5, the UE is assumed to include the reception unit capable of receiving two frequencies at the same time. Thus, a substantial call stop, that is, a service stop, is generated for each reception unit only in the sections $T_{12}$ and $T_{21}$ in which the retuning of a baseband and an RF is generated. In accordance with the first embodiment, however, since the reception units perform the measurement with a time difference, the sections $T_{12}$ and $T_{21}$ in each of which the service stop occurs are different for each reception unit. Accordingly, the sections $T_{12}$ according to the reception units do not overlap with one another, and the sections $T_{21}$ also do not overlap with one another. As a result, the total measurement section is slightly increased, but there is no significant influence because an increment of the time $C_1M_2$ necessary for measurement is slightly greater than an increment of the time $T_{12}, T_{21}$ taken to retune a baseband and an RF.

An ideal transfer rate of UE in accordance with the method of FIG. 5 is presented at the bottom of FIG. 5. That is, from FIG. 5, it can be seen that there is call interruption section as compared with the method presented in FIG. 3.

Figure 6:
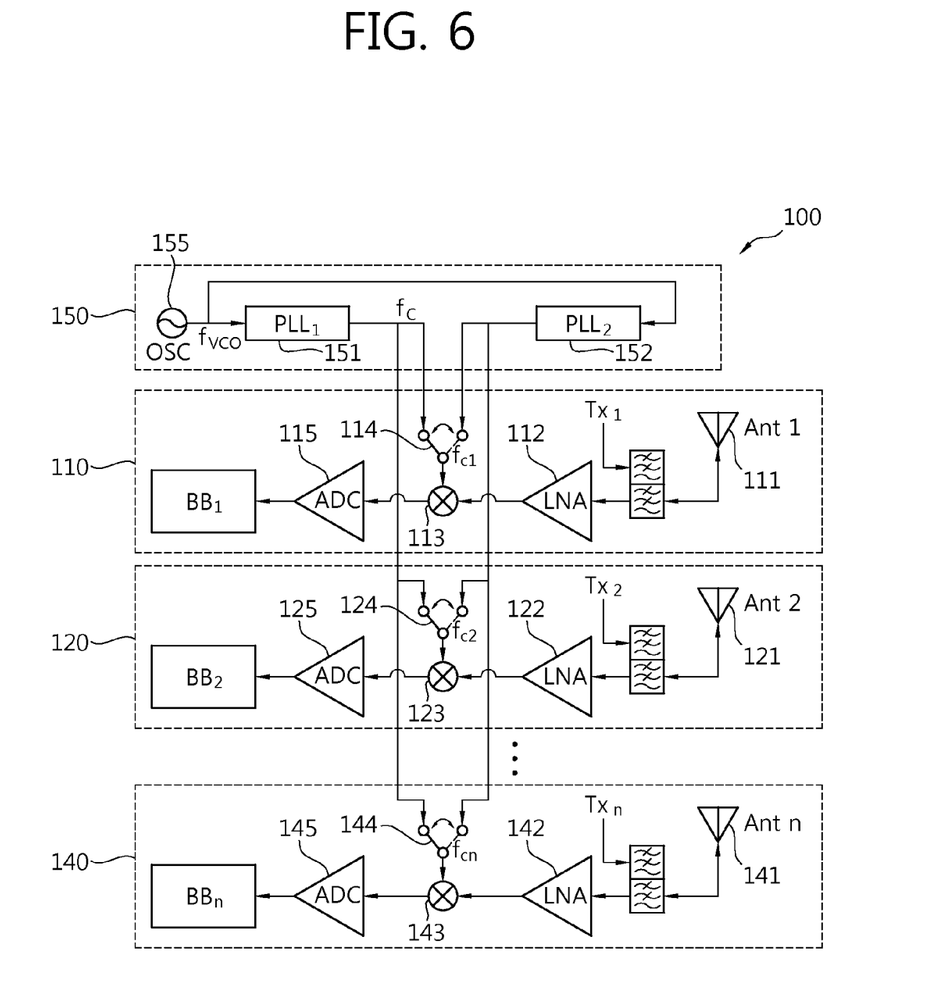
FIG. 6 shows the structure of a MIMO receiver for embodying the method in accordance with the first embodiment of the present invention shown in FIGS. 4 and 5.

FIG. 6 shows the structure of a MIMO receiver for embodying the method in accordance with the first embodiment of the present invention shown in FIGS. 4 and 5.

In the method in accordance with the first embodiment of the present invention, reception units do not perform measurement at the same time, but perform measurement with a time difference. Accordingly, since a carrier inputted to the frequency-down converter of each reception unit requires a maximum of two subcarriers independently, there is a need for two Phase Locked Loops (PLLs) and switches for selecting proper PLLs for respective reception units.

Particularly, as can be seen with reference to FIG. 6, the MIMO receiver 100 in accordance with the first embodiment of the present invention may include an oscillation unit 150 and n reception units (i.e., reception units 110, 120, ..., 140 in FIG. 6).

The oscillation unit 150 includes an OSC 155 and first and second PLLs 151 and 152.

The first reception unit 110 may include a first antenna 111, a first Low Noise Amplifier (LNA) 112, a first mixer 113, a first switch 114, and a first Analog Digital Converter (ADC) 115. The second reception unit 120 may include a second antenna 121, a second LAN 122, a second mixer 123, a second switch 124, and a first ADC 125. Meanwhile, likewise, an $n^{th}$ reception unit, for example, the fourth reception unit 140 may include a fourth antenna 141, a fourth LAN 142, a fourth mixer 143, a fourth switch 144, and a fourth ADC 145.

An operation is described below.

The first PLL 151 may lock a signal, generated from the OSC 155, to a first frequency $f_1$ and output the resulting signal. The second PLL 152 may lock a signal, generated from the OSC 155, to a second frequency $f_2$ and output the resulting signal.

The outputs of the first PLL 151 is distributed to the switches 114, 124, and 144. Furthermore, the output of the second PLL 152 is also distributed to the switches 114, 124, and 144.

The switches 114, 124, ..., 144 each select one or more of the output of the first PLL 151 and the output of the second PLL 152 under the control of a control unit (not shown) and input the selected signals to the respective mixers 113, 123, ..., 144.

The signals selected by the respective antennas 111, 121, ..., 141 are amplified through the respective LNAs 112, 122, ..., 142 and then inputted to the respective mixers 113, 123, ..., 144.

The mixers 113, 123, ..., 144 mix the respective outputs selected by the switches 114, 124, ..., 144 from the output of the first PLL 151 and the output of the second PLL 152 with the signals amplified by the respective LNAs 112, 122, ..., 142. The ADCs 115, 125, ..., 145 convert the mixed signals into digital signals and output the digital signal to BB1, BB2, ..., BBn.

A process in which the method shown in FIG. 4 operates through this construction is described below.

First, it is assumed that the first PLL 151 adjusts the phase of the OSC 155 to the second frequency $f_1$ and outputs the adjusted phase and the second PLL 152 adjusts the phase of the OSC 155 to the second frequency $f_2$ and outputs the adjusted phase.

In a time t1 shown in FIG. 4, the first switch 114 of the first reception unit 110 selects the output of the output of the first PLL 151, that is, the first frequency $f_1$ and outputs the selected output to the first mixer 113. Likewise, in the time t1, the second to fourth switches 124, ..., 144 of the second to fourth reception units 120, ..., 140 each select the output of the first PLL 151, that is, the first frequency $f_1$, and output the selected outputs to the second to fourth mixers 123, ..., 143, respectively. Accordingly, in the time t1, service through the first frequency $f_1$ is made possible in the first reception unit 110, the second reception unit 120 to the fourth reception unit 140.

Meanwhile, in a time t2, the first switch 114 of the first reception unit 110 performs switching in order to select the output of the second PLL 152, that is, the second frequency $f_2$. During the switching time t2, a service interruption occurs because the first reception unit 110 cannot process the first frequency $f_1$. During the time t2, however, the second to fourth switches 124, ..., 144 of the second to fourth reception units 120, ..., 140 each select the output of the first PLL 151, that is, the first frequency and output the selected outputs to the second to fourth mixers 123, ..., 133. As a result, an interruption of service through the first frequency $f_1$ does not occur. Accordingly, there is no interruption of service during the time t2.

Meanwhile, in a time t3, the first switch 114 of the first reception unit 110 selects the output of the second PLL 152, that is, the second frequency $f_2$, and outputs the selected output to the first mixer 113. During the time t3, the first reception unit 110 performs measurement through the second frequency $f_2$. As a result, service through the first frequency $f_1$ cannot be processed through the first reception unit 110. However, during the time t3, the second to fourth switches 124, ..., 134 of the second to fourth reception units 120, ..., 140 each select the output of the first PLL 151, that is, the first frequency $f_1$, and output the selected outputs to the second to fourth mixers 123, ..., 133. Accordingly, an interruption of service through the first frequency $f_1$ is not generated. As a result, there is not interruption of service through the time t2.

Meanwhile, during a time t4, the first switch 114 of the first reception unit 110 performs switching in order to select the output of the first PLL 151, that is, the first frequency $f_1$.

Furthermore, during a time t5, the second switch 114 performs switching in order to select the output of the second PLL 152, that is, the second frequency $f_2$.

Furthermore, during a time t6, the second reception unit 120 performs measurement through the second frequency $f_2$, and thus service through the first frequency $f_1$ cannot be processed through the second reception unit 110. During the time t6, however, the first and the fourth switches 114 and 144 of the first and the fourth reception units 110 and 140 each select the output of the first PLL 151, that is, the first frequency $f_1$, and output the selected outputs to the first and the fourth mixers 113 and 143. Accordingly, an interruption of service through the first frequency $f_1$ is not generated. As a result, there is not interruption of service through the time t6.

Meanwhile, a process in which the method shown in FIG. 5 operates through the construction of FIG. 6 is described below.

In a time t1 shown in FIG. 6, the first switch 114 of the first reception unit 110 selects the output of the output of the first PLL 151, that is, the first frequency $f_1$ and outputs the selected output to the first mixer 113. Likewise, in the time t1, the second to fourth switches 124, ..., 144 of the second to fourth reception units 120, ..., 140 each select the output of the first PLL 151, that is, the first frequency and output the selected outputs to the second to fourth mixers 123, ..., 143, respectively. Accordingly, in the time t1, service through the first frequency $f_1$ is made possible in the first reception unit 110, the second reception unit 120 to the fourth reception unit 140.

Meanwhile, in a time t2, the first switch 114 of the first reception unit 110 performs switching in order to select both the output of the first PLL 151, that is, the first frequency $f_1$, and the output of the second PLL 152, that is, the second frequency $f_2$. During the switching time t2, a service interruption occurs because the first reception unit 110 cannot process the first frequency $f_1$. During the time t2, however, the second to fourth switches 124, ..., 144 of the second to fourth reception units 120, ..., 140 each select the output of the first PLL 151, that is, the first frequency $f_t$ and output the selected outputs to the second to fourth mixers 123, ..., 133. As a result, an interruption of service through the first frequency $f_1$ does not occur. Accordingly, there is no interruption of service during the time t2.

Meanwhile, during a time t3, the second switch 114 performs switching in order to select the output of the second PLL 152, that is, the second frequency $f_2$. During the time t3, the first switch 114 selects both the output of the first PLL 151, that is, the first frequency and the output of the second PLL 152, that is, the second frequency $f_2$, and outputs them to the first mixer 113 so that service through the first frequency $f_1$ can be processed and at the same time measurement can be performed through the second frequency $f_2$. Meanwhile, during the time t3, the fourth switch 144 selects the output of the first PLL 151, that is, the first frequency $f_1$, and outputs the selected output to the fourth mixer 143. Accordingly, there is no interruption of service during the time t3.

As described above, in accordance with the measurement method of the first embodiment, in the case of a voice call, an additional signal processing process for processing a measurement gap can be omitted because the measurement gap is not necessary. Furthermore, there is an advantage in terms of the scheduling of a control station because a measurement gap is not used as described above. The measurement method in accordance with the first embodiment does not have a significant advantage as compared with the existing method in terms of an overall transfer rate because a substantial measurement section is increased. The second embodiment that is more improved is described below.

Figure 7:
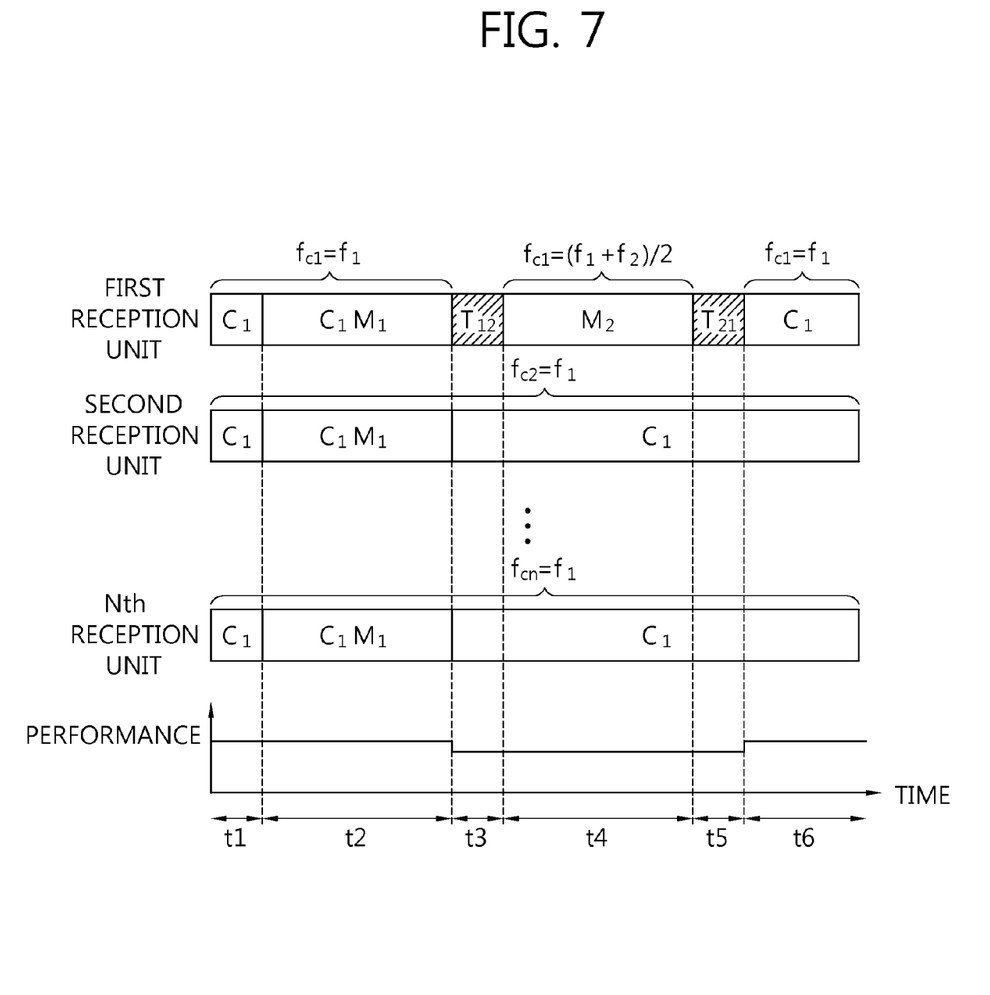
FIG. 7 is an exemplary diagram showing a method in which reception units perform inter-frequency measurement at the same time in accordance with a second embodiment in UE which can support MIMO and receive only one frequency at once.

FIG. 7 is an exemplary diagram showing a method in which reception units perform inter-frequency measurement at the same time in accordance with the second embodiment in UE which can support MIMO and receive only one frequency at once.

In most of measurement, if only wideband measurement values for all reception bands are used in inter-frequency measurement and measurement for a channel state is performed for each subchannel within the reception band, measurement for intra-frequency is chiefly performed.

Statistical characteristics for the wideband measurement values of a first frequency $f_1$ that is being served and a second frequency $f_2$ to be measured are almost similar. In particular, if a difference between the first frequency $f_1$ and the second frequency $f_2$ is not so great, this similarity is increased. Accordingly, if substantial measurement for the second frequency $f_2$ is performed in an $n^{th}$ reception unit, although measurement is not substantially performed on the second frequency $f_2$ in a $k^{th}$ reception unit, a measurement value $m_{2,k}$ (i.e., a measurement value for the second frequency $f_2$ in the $k^{th}$ reception unit) can be estimated as in Equation below.

$$m_{2,k} = m_{2,n} + \Delta_{2,kn} \approx m_{2,n} + \Delta_{1,kn} \qquad \text{Equation 2}$$

In Equation above, $\Delta_{2,kn}$ is an error of a statistical characteristic between the $k^{th}$ reception unit and the $n^{th}$ reception unit for the second frequency $f_2$. Likewise, $\Delta_{1,kn}$ is an error of a statistical characteristic between the $k^{th}$ reception unit and the $n^{th}$ reception unit for the first frequency $f_1$ in relation to a corresponding measurement item.

A detailed method through this estimation is described below with reference to FIG. 7.

As can be seen with reference to FIG. 7, UE can use service using the first frequency $f_1$, and the UE has to perform measurement for the second frequency $f_2$. A section $C_1$ is a section in which service is now being provided, and sections $T_{12}$ and $T_{21}$ mean respective sections in which a reception unit has to be retuneed between the second frequency $f_1$ and the second frequency $f_2$.

Furthermore, a section $M_2$ indicates that the UE is performing actual channel quality measurement for the second frequency $f_2$. $C_1 M_2$ is a section in which service is being used in the first frequency $f_1$ and measurement for the second frequency $f_2$ is performed. The frequency of a carrier used in a frequency-down converter for each reception unit is indicated on the upper side of a section that corresponds to each reception unit.

In the section $M_2$ of FIG. 7, only one reception unit exists, and measurement values for the second frequency $f_2$ may be estimated from values measured for the first frequency $f_1$ by the respective reception units during the section $C_1 M_1$ in the remaining reception units.

In accordance with the second embodiment proposed by the present invention, measurement is possible without increasing a measurement section or stopping a call, and an ideal transfer rate of UE is proposed at the bottom of FIG. 7.

Meanwhile, in accordance with the second embodiment proposed by the present invention, the power consumption of a receiver is reduced because power consumption according to the retuning of a reception unit is also performed on only one reception unit.

Figure 8:
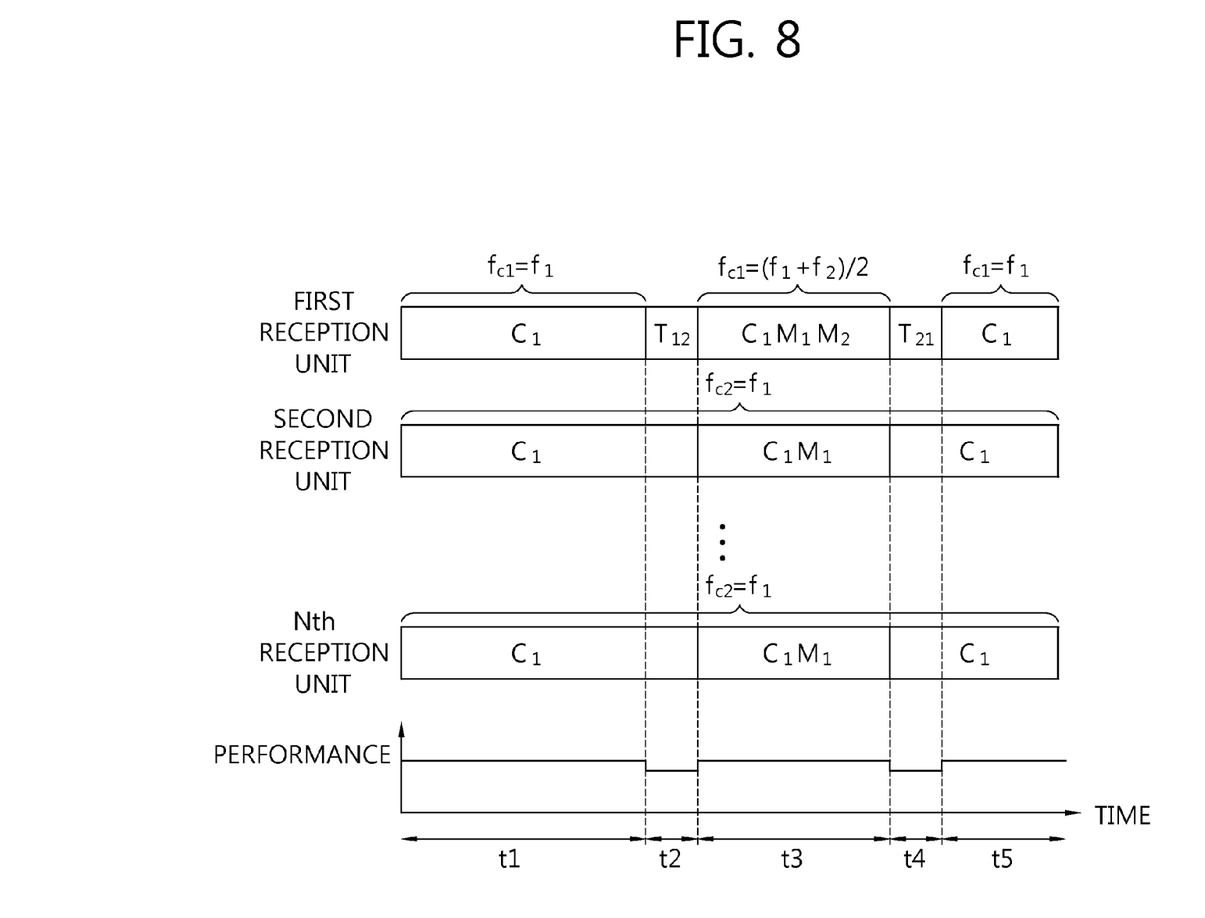
FIG. 8 is an exemplary diagram showing a method in which reception units perform inter-frequency measurement at the same time in accordance with the second embodiment in UE which can support MIMO and receive two or more frequencies at once.

FIG. 8 is an exemplary diagram showing a method in which reception units perform inter-frequency measurement at the same time in accordance with the second embodiment in UE which can support MIMO and receive two or more frequencies at once.

As can be seen with reference to FIG. 8, the UE can use service using a first frequency $f_1$, and the UE has to perform measurement for a second frequency $f_2$. A section $C_1$ is a section in which service is now being provided, and sections $T_{12}$ and $T_{21}$ mean respective sections in which the retuning of a reception unit is performed between the first frequency $f_1$ and the second frequency $f_2$.

Furthermore, a section $M_2$ indicates that the UE is performing actual channel quality measurement for the second frequency $f_2$. $C_1 M_1$ means a section in which the reception of data and measurement are performed using the first frequency $f_1$, and $C_1 M_2$ is a section in which service is being used through the first frequency $f_1$ and measurement for the second frequency $f_2$ is performed. The frequency of a carrier used in a frequency-down converter for each reception unit is indicated on the upper side of a section that corresponds to each reception unit.

The UE considered in FIG. 8 includes reception units capable of receiving a plurality of frequencies at the same time. Accordingly, a substantial call stop, that is, a service stop, is generated only in the sections $T_{12}$ and $T_{21}$ in which the retuning of a baseband and an RF is generated. Furthermore, a section in which the retuning of the reception unit is generated exists only in one reception unit.

$m_2$ that is substantially necessary to calculate Equation 2 is measured only in one reception unit, and the remains may be measured from the measurement values $m_1$ of the respective reception units which have been measured in parallel for the first frequency $f_1$ through which data is being received. Accordingly, measurement can be performed without increasing a measurement section or stopping a call.

An ideal transfer rate of UE is presented at the bottom of FIG. 8. Furthermore, the power consumption of UE is reduced because power consumption according to the retuning of a reception unit is also performed on only one reception unit.

Meanwhile, an error $\Delta_{1,kn}$ for estimating the measurement value $m_2$ for the second frequency $f_2$, that is, the subject of measurement, from the measurement value $m_1$ for the first frequency $f_1$ that is being served can be easily calculated as a simple difference if a statistical characteristic is almost statically maintained between reception units, which is as follows.

$$\Delta_{2,kn} \approx \Delta_{1,kn} \approx m_{1,k} - m_{1,n} \qquad \text{Equation 3}$$

Meanwhile, if the accuracy of additional measurement is required, the method in accordance with the first embodiment and the method in accordance with the second embodiment may be used in combination. For example, a look-up table for statistical correction values is written in a specific section in advance using a method in according to the first embodiment. In accordance with this look-up table, an error $\Delta_{1,kn}$ for estimating the measurement value $m_2$ for the second frequency $f_2$ from the measurement value $m_1$ for the first frequency $f_1$ can be calculated.

Meanwhile, a MIMO receiver for embodying the method in accordance with the second embodiment that has been described so far is configured to compensate for a characteristic difference between reception units necessary for intra-frequency measurement on the basis of measured values by performing substantial measurement for the inter-frequency $f_2$ in only one reception unit, that is, a reference, and performing intra-frequency measurement for the first frequency $f_1$ that is now being served in relation to the same measurement items before/after the measurement.

The method in accordance with the second embodiment that has been described so far may operate through the structure of the receiver presented in FIG. 6, but may operate through a more simplified receiver.

The structure of the more simplified receiver is described below with reference to FIG. 9.

Figure 9:
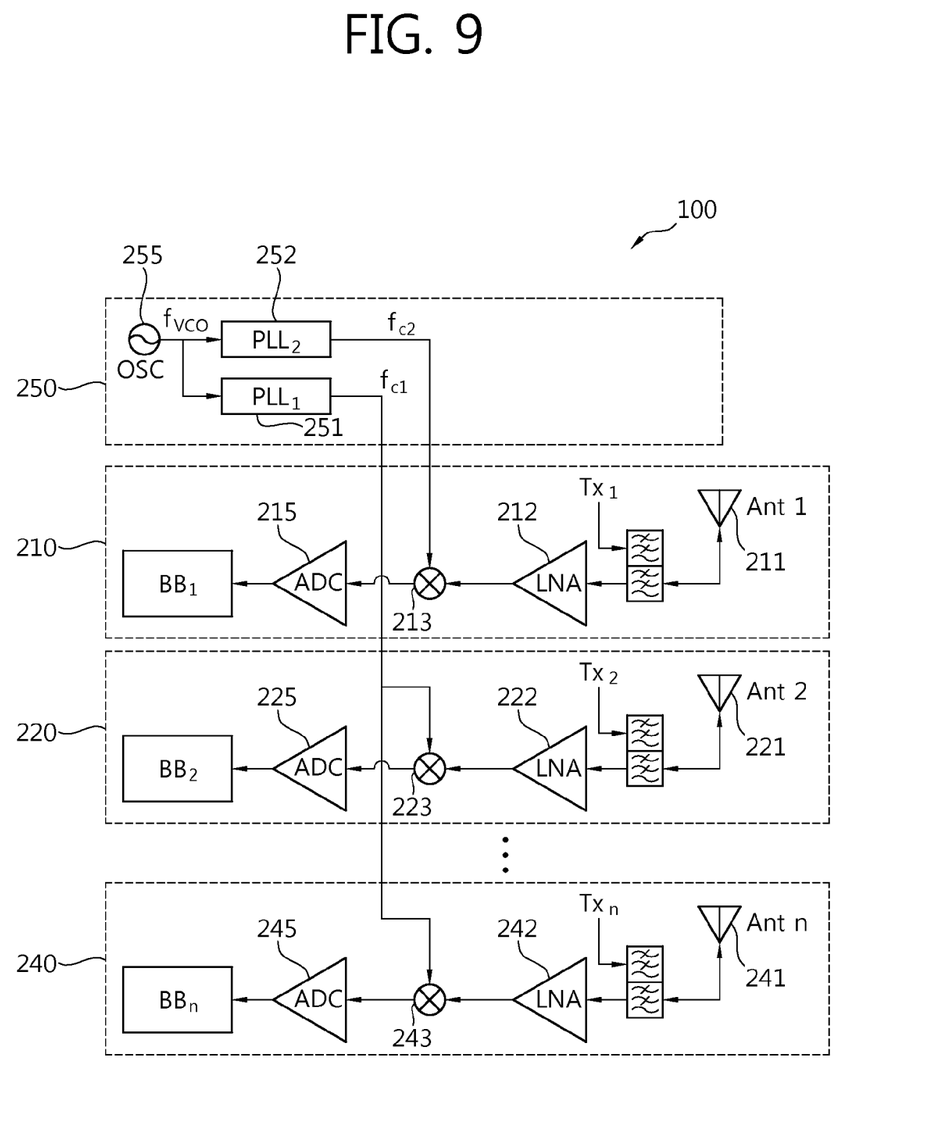
FIG. 9 shows the structure of a MIMO receiver for embodying the method in accordance with the second embodiment of the present invention shown in FIGS. 7 and 8.

FIG. 9 shows the structure of a MIMO receiver for embodying the method in accordance with the second embodiment of the present invention shown in FIGS. 7 and 8.

The method in accordance with the second embodiment of the present invention basically requires two Phase-Locked Loops (PLLs) because two carriers are used at the same time.

Particularly, as can be seen with reference to FIG. 9, the MIMO receiver 200 in accordance with the second embodiment of the present invention may include an oscillation unit 250 and n reception units (i.e., reception units 210, 220, ..., 240 in FIG. 9).

The oscillation unit 250 includes an OSC 255 and first and second PLLs 251 and 252.

The first reception unit 210 may include a first antenna 211, a first LAN 212, a first mixer 213, and a first ADC 215. The second reception unit 220 may include a second antenna 221, a second LAN 222, a second mixer 223, and a second ADC 225. Meanwhile, likewise, an $n^{th}$ reception unit, for example, the fourth reception unit 240 may include a fourth antenna 241, a fourth LAN 242, a fourth mixer 243, and a fourth ADC 245.

A basic operation is described below.

The first PLL 251 may lock a signal, generated from the OSC 255, to the first frequency $f_1$ and output the resulting signal. The second PLL 252 may lock a signal, generated from the OSC 255, to the first frequency $f_1$ or the second frequency $f_2$ and output the resulting signal.

The output of the second PLL 252 is inputted to the first mixer 213, and the output of the first PLL 251 is inputted to, for example, the second mixer 224 and the fourth mixer 223.

Signals received by the respective antennas 211, 221, ..., 241 are amplified through respective LNAs 212, 222, ..., 242 and then inputted to the respective mixers 213, 223, ..., 244.

The first mixer 213 mixes the output of the second PLL 252 with the signal amplified by the first LNA 212. The second mixer 223 to the fourth mixer 243 mix the output of the first PLL 251 with the signals amplified by the second LNA 222 to the fourth LNA 242, respectively.

The ADCs 215, 225, ..., 245 convert the mixed signals into digital signals and output them to BB1, BB2, ..., BBn.

A process in which the method shown in FIG. 7 operates through this construction is described below.

First, it is assumed that the first PLL 251 adjusts the phase of the OSC 255 to the first frequency $f_1$ and outputs the adjusted phase and the second PLL 252 adjusts the phase of the OSC 255 to the first frequency $f_1$ or the second frequency $f_2$ and outputs the adjusted phase.

In a time t1 shown in FIG. 7, the reception units 210, 220, ..., 240 receive the first frequency $f_1$ and perform service.

Next, during a time t2, the reception units 210, 220, ..., 240 receive the first frequency $f_1$ and perform service and, at the same time, perform measurement for the first frequency $f_1$ (i.e., $C_1M_1$).

Meanwhile, in a time t3, the second PLL 252 retunes the signal from the OSC 255 to the second frequency $f_2$. Accordingly, in the time t3, service through the first reception unit is stopped. In the time t3, however, the second reception unit to the fourth reception unit 220, ..., 240 receive the first frequency $f_1$ and perform service. Accordingly, during the time t3, a service interruption is not generated when all the reception units are taken into consideration.

In a time t4, the first reception unit 210 performs measurement for the second frequency $f_2$, and the second reception unit to the fourth reception unit 220, ..., 240 receive the first frequency $f_1$ and perform service.

When the measurement in the first reception unit 210 is completed, a control unit estimates results of the measurement for the first frequency $f_1$ in the second reception unit to the fourth reception unit 220, ..., 240 using a result of measurement for the second frequency $f_2$ in the first reception unit and results of the measurement for the first frequency $f_1$ in the second reception unit to the fourth reception unit 220, ..., 240.

Meanwhile, a process in which the method shown in FIG. 8 operates through the construction of FIG. 9 is described below.

In a time t1 shown in FIG. 8, the reception units 210, 220, . . . , 240 receive the first frequency $f_1$ and perform service.

Next, during a time t2, the second PLL 252 retunes the signal from the OSC 255 to the first frequency $f_1$ and the second frequency $f_2$. Accordingly, in the time t2, service through the first reception unit is interrupted. In the time t2, however, the second reception unit to the fourth reception unit 220, . . . , 240 receive the first frequency $f_1$ and perform service. Accordingly, during the time t2, a service interruption is not generated when all the reception units are taken into consideration.

In a time t3, the first reception unit 210 receives the first frequency $f_1$ and, at the same time, receives the second frequency $f_2$. That is, the first reception unit 210 performs service through the first frequency $f_1$ and, at the same time, performs measurement for the second frequency $f_2$. Furthermore, in the time t3, the second to fourth reception unit 220, . . . , 240 receive the first frequency $f_1$ and perform service and, at the same time, perform measurement for the first frequency $f_1$.

When the measurement in the first reception unit 210 is completed, the control unit estimates results of the measurement for the first frequency $f_1$ in the second reception unit to the fourth reception unit 220, . . . , 240 using a result of the measurement for the second frequency $f_2$ in the first reception unit and results of the measurement for the first frequency $f_1$ in the second reception unit to the fourth reception unit 220, . . . , 240.

Meanwhile, the methods described so far may be stored in a storage medium and may be executed by the above-described control unit.

Although the preferred embodiments of the present invention have been illustrated, the scope of the present invention is not limited to the specific embodiments and thus the present invention may be modified, changed, or improved in various ways within the spirit of the present invention and the category of the claims.

The invention claimed is:

1. A method of measuring inter-frequency in a receiver comprising a plurality of reception antennas, the method comprising the steps of:
   performing service using a first frequency through one or more of a first antenna and a second antenna;
   performing measurement for a second frequency using the first antenna while continuing to perform the service using the first frequency through the second antenna; and
   estimating a result of measurement for the second frequency through the second antenna without actual measurement for the second frequency through the second antenna, using a result of the measurement for the second frequency through the first antenna.

2. The method of claim 1, wherein service is performed by receiving and processing the first frequency through the first antenna, while the measurement for the second frequency is performed.

3. The method of claim 1, wherein the step of performing the measurement for the second frequency comprises the step of retuning a reception terminal of the first antenna to the second frequency.

4. The method of claim 3, wherein service is performed by receiving and processing the first frequency through the second antenna, while the reception terminal of the first antenna is retuned to the second frequency.

5. The method of claim 1, wherein a measurement value for the second frequency through the second antenna is estimated using a result of the measurement for the second frequency through the first antenna and a statistical characteristic error value between the first antenna and the second antenna.

6. The method of claim 1, wherein assuming that a measurement value for the second frequency through the second antenna is $m_{2,k}$, the $m_{2,k}$ is estimated by an equation $m_{2,k} = m_{2,n} + \Delta_{2,kn} \approx m_{2,n} + \Delta_{1,kn}$,
   wherein the $m_{2,n}$ is a measurement value for the second frequency through the first antenna, $\Delta_{2,kn}$ is an error of a statistical characteristic between the measurement value through the first antenna and the measurement value through the second antenna for the second frequency, and $\Delta_{1,kn}$ is an error of a statistical through characteristic between a measurement value through the first antenna and a measurement value through the second antenna for the first frequency $f_1$.

7. The method of claim 6, wherein $\Delta_{2,kn} \approx \Delta_{1,kn} \approx m_{1,k} - m_{1,n}$, the $m_{1,k}$ is a result of the measurement value for the first frequency in the first antenna, and the $m_{1,n}$ is a result of the measurement value for the first frequency in the second antenna.

8. The method of claim 1, further comprising the step of retuning a reception terminal of the first antenna to the second frequency in order to perform the measurement for the first frequency and the second frequency through the first antenna.

9. The method of claim 8, wherein service is performed by receiving and processing the first frequency through the second antenna, while the reception terminal of the first antenna is retuned to the second frequency.

10. A method of measuring inter-frequency in a receiver comprising a plurality of reception antennas, the method comprising the steps of:
    performing service using a first frequency through one or more of a first antenna and a second antenna;
    simultaneously performing measurement for the first frequency and the second frequency, while continuing to perform service using the first frequency through the first antenna;
    performing measurement for the first frequency while continuing to perform service using the first frequency through the second antenna; and
    estimating a result of measurement for the second frequency through the second antenna without actual measurement for the second frequency through the second antenna, using a difference between result values of the measurement for the first frequency through the first antenna and the second antenna and a result value of the measurement for the second frequency in the second antenna.

11. The method of claim 10, further comprising the step of performing service using the first frequency through the second antenna, while performing the measurement for the first frequency and the second frequency through the first antenna.

12. The method of claim 11, wherein assuming that a measurement value for the second frequency through the second antenna is $m_{2,k}$, the $m_{2,k}$ is estimated by an equation $m_{2,k} = m_{2,n} + \Delta_{2,kn} \approx m_{2,n} + \Delta_{1,kn}$,
    wherein the $m_{2,n}$ is a measurement value for the second frequency through the first antenna, $\Delta_{2,kn}$ is an error of a statistical characteristic between the measurement value through the first antenna and the measurement value through the second antenna for the second frequency, and $\Delta_{1,kn}$ is an error of a statistical characteristic between a measurement value through the first antenna and a measurement value through the second antenna for the first frequency $f_1$.

13. The method of claim 12, wherein $\Delta_{2,kn} \approx \Delta_{1,kn} \approx m_{1,k} - m_{1,n}$, the $m_{1,k}$ is a result of the measurement value for the first frequency in the first antenna, and the $m_{1,n}$ is a result of the measurement value for the first frequency in the second antenna.

* * * * *